United States Patent
Montanari et al.

(10) Patent No.: US 12,551,117 B2
(45) Date of Patent: Feb. 17, 2026

(54) BLOOD PRESSURE MONITORING

(71) Applicant: Omnibuds Ltd, Cambridge (GB)

(72) Inventors: Alessandro Montanari, Cambridge (GB); Hoang Truong, Boulder, CO (US); Fahim Kawsar, Cambridge (GB)

(73) Assignee: Omnibuds Ltd, Cambridge (GB)

( * ) Notice: Subject to any disclaimer, the term of this patent is extended or adjusted under 35 U.S.C. 154(b) by 0 days.

(21) Appl. No.: 18/318,203

(22) Filed: May 16, 2023

(65) Prior Publication Data

US 2024/0000325 A1    Jan. 4, 2024

(30) Foreign Application Priority Data

May 19, 2022    (EP) .................................... 22174254

(51) Int. Cl.
     *A61B 5/021*       (2006.01)
     *A61B 5/00*       (2006.01)
     *A61B 7/04*       (2006.01)
     *A61B 5/024*       (2006.01)

(52) U.S. Cl.
CPC ........ *A61B 5/02125* (2013.01); *A61B 5/6817* (2013.01); *A61B 7/04* (2013.01); *A61B 5/02427* (2013.01); *A61B 5/02438* (2013.01); *A61B 2562/0204* (2013.01)

(58) Field of Classification Search
CPC .............. A61B 5/02125; A61B 5/6817; A61B 5/02427; A61B 5/02438; A61B 7/04; A61B 2562/0204
See application file for complete search history.

(56) References Cited

U.S. PATENT DOCUMENTS

| | | | |
|---|---|---|---|
| 9,820,658 B2* | 11/2017 | Tran | A61B 5/7225 |
| 2006/0206014 A1 | 9/2006 | Ariav | |
| 2008/0097228 A1 | 4/2008 | Alhara et al. | |
| 2013/0171599 A1* | 7/2013 | Bleich | A63B 24/0062 434/247 |
| 2014/0073962 A1* | 3/2014 | Addison | A61B 5/02427 600/479 |
| 2014/0081152 A1* | 3/2014 | Clinton | A61B 5/02438 600/479 |

(Continued)

FOREIGN PATENT DOCUMENTS

| | | |
|---|---|---|
| EP | 3488766 A1 | 5/2019 |
| WO | 2021/173520 A1 | 9/2021 |

OTHER PUBLICATIONS

Chenxi Yang; "Pulse Transit Time Measurement Using Seismocardiogram, Photoplethysmogram, and Acoustic Recordings: Evaluation and Comparison"; IEEE Journal of Biomedical and Health Informatics, vol. 22, No. 3, May 2018 (Year: 2018).*

(Continued)

*Primary Examiner* — Dixomara Vargas
(74) *Attorney, Agent, or Firm* — Venable LLP

(57) ABSTRACT

An apparatus comprising: at least one photoplethysmography sensor configured to determine pulse information of a user; at least one audio sensor configured to determine heart sound information of the user; and means for determining, based, at least in part, on the pulse information and the heart sound information, blood pressure information of the user, wherein the at least one photoplethysmography sensor and the at least one audio sensor are comprised in an ear-worn device.

16 Claims, 5 Drawing Sheets

(56) References Cited

U.S. PATENT DOCUMENTS

| | | | |
|---|---|---|---|
| 2015/0051500 A1* | 2/2015 | Elliott | A61B 5/14532 |
| | | | 600/491 |
| 2015/0073230 A1 | 3/2015 | Stergiou | |
| 2016/0045654 A1* | 2/2016 | Connor | A61M 60/894 |
| | | | 600/16 |
| 2017/0112447 A1 | 4/2017 | Aumer et al. | |
| 2017/0135633 A1* | 5/2017 | Connor | A61N 1/36557 |
| 2017/0249445 A1* | 8/2017 | Devries | A61B 5/145 |
| 2018/0035949 A1 | 2/2018 | Narasimhan | |
| 2018/0153476 A1* | 6/2018 | Annoni | G16H 50/30 |
| 2018/0235540 A1 | 8/2018 | Kirszenblat et al. | |
| 2018/0296157 A1* | 10/2018 | Bleich | A61B 7/00 |
| 2019/0150851 A1* | 5/2019 | Clark | A61B 5/42 |
| 2019/0167176 A1* | 6/2019 | Annoni | A61B 5/4035 |
| 2019/0167209 A1* | 6/2019 | Annoni | A61B 5/0826 |
| 2019/0365263 A1* | 12/2019 | Raj | A61B 5/0024 |
| 2020/0008685 A1 | 1/2020 | Stahmann et al. | |
| 2020/0405159 A1* | 12/2020 | Archdeacon | A61B 5/7278 |
| 2021/0045647 A1 | 2/2021 | Barnacka et al. | |
| 2021/0137457 A1 | 5/2021 | Matsumoto et al. | |
| 2021/0169417 A1* | 6/2021 | Burton | A61B 5/4857 |
| 2021/0275038 A1 | 9/2021 | Guo et al. | |
| 2021/0330189 A1* | 10/2021 | Rose | H04N 23/56 |
| 2021/0353165 A1* | 11/2021 | Galeev | A61B 5/7264 |
| 2021/0379388 A1* | 12/2021 | Connor | A61M 60/232 |
| 2022/0054008 A1* | 2/2022 | Venkatraman | G16H 50/70 |
| 2023/0173221 A1* | 6/2023 | Shouldice | G16H 20/40 |
| | | | 600/26 |
| 2023/0320602 A1* | 10/2023 | Qiu | A61B 5/02416 |
| | | | 600/480 |
| 2024/0065550 A1* | 2/2024 | Connor | A61M 60/546 |
| 2024/0081657 A1* | 3/2024 | Atashzar | A61B 5/6814 |

OTHER PUBLICATIONS

Esmaili et al. ; "Non-invasive Blood Pressure Estimation Using Phonocardiogram"; IEEE, pp. 1-4 (Year: 2017).*

Elgend et al.; "The use of photoplethysmography for assessing hypertension"; npj Digital Medicine (2019); pp. 1-11 (Year: 2019).*

Hsiao et al. ; "Design and Implementation of Auscultation Blood Pressure Measurement using Vascular Transit Time and Physiological Parameters"; 7 IEEE International Conference on Systems, Man, and Cybernetics (SMC) Banff Center, Banff, Canada, Oct. 5-8, 2017 (Year: 2017).*

"Hypertension", World Health Organization (WHO), Retrieved on Jun. 9, 2023, Webpage available at : https://www.who.int/news-room/fact-sheets/detail/hypertension.

"Facts About Hypertension", Centers for Disease Control and Prevention, Retrieved on Jun. 9, 2023, Webpage available at : https://www.cdc.gov/bloodpressure/facts.htm.

Benjamin et al., "Heart Disease and Stroke Statistics—2018 Update: A Report From the American Heart Association",Circulation, vol. 137, No. 12, Mar. 20, 2018, pp. e67-e492.

McGhee et al., "Monitoring Arterial Blood Pressure: What You May Not Know", Critical Care Nurse, vol. 22, No. 2, Apr. 2002, pp. 60-78.

Bui et al., "eBP: A Wearable System For Frequent and Comfortable Blood Pressure Monitoring From User's Ear", The 25th Annual International Conference on Mobile Computing and Networking, Oct. 2019, Article No. 53,17 pages.

Elgendi et al., "The use of photoplethysmography for assessing hypertension", NPJ Digital Medicine, vol. 2, Article No. 60, 2019, pp. 1-11.

Smith et al., "Pulse transit time: an appraisal of potential clinical applications", Thorax, vol. 54, No. 5, May 1999, pp. 452-457.

Pitson et al., "Changes in pulse transit time and pulse rate as markers of arousal from sleep in normal subjects", Clinical Science, vol. 87, No. 2, 1994, pp. 269-273.

Yang et al., "Pulse transit time measurement using seismocardiogram and in-ear acoustic sensor", IEEE Biomedical Circuits and Systems Conference (BioCAS), Oct. 17-19, 2016, pp. 188-191.

Yang et al., "Pulse transit time measurement using seismocardiogram, photoplethysmogram, and acoustic recordings: Evaluation and comparison", IEEE Journal of Biomedical and Health Informatics, vol. 22, No. 3, May 2018, pp. 733-740.

Winokur et al., "A wearable vital signs monitor at the ear for continuous heart rate and pulse transit time measurements", Annual International Conference of the IEEE Engineering in Medicine and Biology Society, Aug. 28-Sep. 1, 2012, pp. 2724-2727.

Zhang et al., "A Machine Learning-Empowered System for Long-Term Motion-Tolerant Wearable Monitoring of Blood Pressure and Heart Rate With Ear-ECG/PPG", IEEE Access, vol. 5, May 24, 2017, pp. 10547-10561.

Foo et al., "Evaluation of blood pressure changes using vascular transit time", Physiological Measurement, vol. 27, No. 8, 2006, pp. 665-694.

Shukla et al., "Noninvasive cuffless blood pressure measurement by vascular transit time", 28th International Conference on VLSI Design, Jan. 3-7, 2015, pp. 535-540.

He et al., "An Ear-Worn Vital Signs Monitor", IEEE Transactions on Biomedical Engineering, vol. 62, No. 11, Nov. 2015, pp. 2547-2552.

Hsiao et al., "Design and implementation of auscultation blood pressure measurement using vascular transit time and physiological parameters", IEEE International Conference on Systems, Man, and Cybernetics (SMC), Oct. 5-8, 2017, pp. 2996-3001.

"Speed of Sound", IT'IS Foundation, Retrieved on Jun. 9, 2023, Webpage available at : https://itis.swiss/virtual-population/tissue-properties/database/acoustic-properties/speed-of-sound/.

Klarhöfer et al., "High-resolution blood flow velocity measurements in the human finger", Magnetic Resonance in Medicine, vol. 45, No. 4, 2001, pp. 716-719.

Chemla et al., "Total arterial compliance estimated by stroke volume-to-aortic pulse pressure ratio in humans", American Journal of Physiology-Heart and Circulatory Physiology, vol. 274, No. 2, 1998, pp. H500-H505.

Mori et al., "How does deep breathing affect office blood pressure and pulse rate?", Hypertension Research, vol. 28, 2005, pp. 499-504.

Mishra et al., "Blood pressure response to cold water immersion test", International Journal of Biology. Pharmacy and Allied Sciences (IJBPAS), vol. 1, No. 10, Nov. 2012, pp. 1483-1491.

"Amazfit PowerBuds Pro", Amazfit US, Retrieved on Jun. 9, 2023, Webpage available at : https://www.amazfit.com/products/amazfit-powerbuds-pro.

"Blood pressure-sensing earbuds are coming in 2020", CNET, Retrieved on Jun. 9, 2023, Webpage available at : https://www.cnet.com/health/blood-pressure-sensing-earbuds-are-coming-in-2020/.

Marzorati et al., "Chest Wearable Apparatus for Cuffless Continuous Blood Pressure Measurements Based on PPG and PCG Signals", IEEE Access, vol. 8, Mar. 16, 2020, pp. 55424-55437.

Extended European Search Report received for corresponding European Patent Application No. 22174254.7, dated Oct. 11, 2022, 11 pages.

Truong et al., "Non-Invasive Blood Pressure Monitoring with Multi-Modal In-Ear Sensing", IEEE International Conference on Acoustics, Speech and Signal Processing (ICASSP), May 23-27, 2022, pp. 6-10.

"Welcome to ICASSP 2022", ICASSP 2022—IEEE International Conference on Acoustics, Speech, and Signal Processing, Retrieved on Jun. 9, 2023, Webpage available at : https://2022.ieeeicassp.org/.

* cited by examiner

BLOOD PRESSURE MONITORING

TECHNOLOGICAL FIELD

Embodiments of the present disclosure relate to blood pressure monitoring. Some relate to blood pressure monitoring in an ear-worn device.

BACKGROUND

Various devices exist for the determination and monitoring of blood pressure of a user.

It would be desirable to improve blood pressure monitoring.

BRIEF SUMMARY

According to various, but not necessarily all, embodiments there is provided an apparatus comprising:
- at least one photoplethysmography sensor configured to determine pulse information of a user;
- at least one audio sensor configured to determine heart sound information of the user; and
- means for determining, based, at least in part, on the pulse information and the heart sound information, blood pressure information of the user, wherein the at least one photoplethysmography sensor and the at least one audio sensor are comprised in an ear-worn device.

In some examples, the ear-worn device is a device worn on and/or in at least one ear of the user.

In some examples, determining blood pressure information of the user comprises determining vascular transit time and ejection time.

In some examples, determining blood pressure information of the user comprises determining S1 and S2 heart sounds based, at least in part, on the heart sound information and/or determining a systolic peak based, at least in part, on the pulse information.

In some examples, determining S1 and S2 heart sounds comprises determining a location of a systolic peak based, at least in part, on the pulse information.

In some examples, the at least one photoplethysmography sensor and/or the at least one audio sensor are configured to operate at a sampling rate in the range 100 Hz to 9 kHz.

In some examples, the means are configured to perform determining calibration information for the user and determining blood pressure of the user based, at least in part, on the blood pressure information and the calibration information.

In some examples, the means for determining are comprised by the ear-worn device.

In some examples, the means comprises
- at least one processor; and
- at least one memory including computer program code, the at least one memory storing instructions that, when executed by the at least one processor, cause the performance of the apparatus.

In some examples, the apparatus comprises the ear-worn device, and a device that is separate from the ear-worn device, wherein the means for determining are comprised in the device that is separate from the ear-worn device.

According to various, but not necessarily all, embodiments there is provided a method comprising:
- determining pulse information of a user using at least one photoplethysmography sensor comprised in an ear-worn device;
- determining heart sound information of the user using at least one audio sensor comprised in the ear-worn device; and
- determining, based, at least in part, on the pulse information and the heart sound information, blood pressure information of the user.

In some examples, the ear-worn device is a device worn on and/or in at least one ear of the user.

In some examples, determining blood pressure information of the user comprises determining vascular transit time and ejection time.

According to various, but not necessarily all, embodiments there is provided computer program comprising instructions for causing an apparatus to perform:
- determining pulse information of a user using at least one photoplethysmography sensor comprised in an ear-worn device;
- determining heart sound information of the user using at least one audio sensor comprised in the ear-worn device; and
- determining, based, at least in part, on the pulse information and the heart sound information, blood pressure information of the user.

In some examples, determining blood pressure information of the user comprises determining vascular transit time and ejection time.

According to various, but not necessarily all, embodiments there is provided an apparatus comprising means for performing at least part of one or more methods disclosed herein.

According to various, but not necessarily all, embodiments there is provided an apparatus configured to perform at least part of one or more methods disclosed herein.

According to various, but not necessarily all, embodiments there is provided examples as claimed in the appended claims.

The description of a function and/or action should additionally be considered to also disclose any means suitable for performing and/or configured to perform that function and/or action.

BRIEF DESCRIPTION

Some examples will now be described with reference to the accompanying drawings in which.

DETAILED DESCRIPTION

Figure 1:
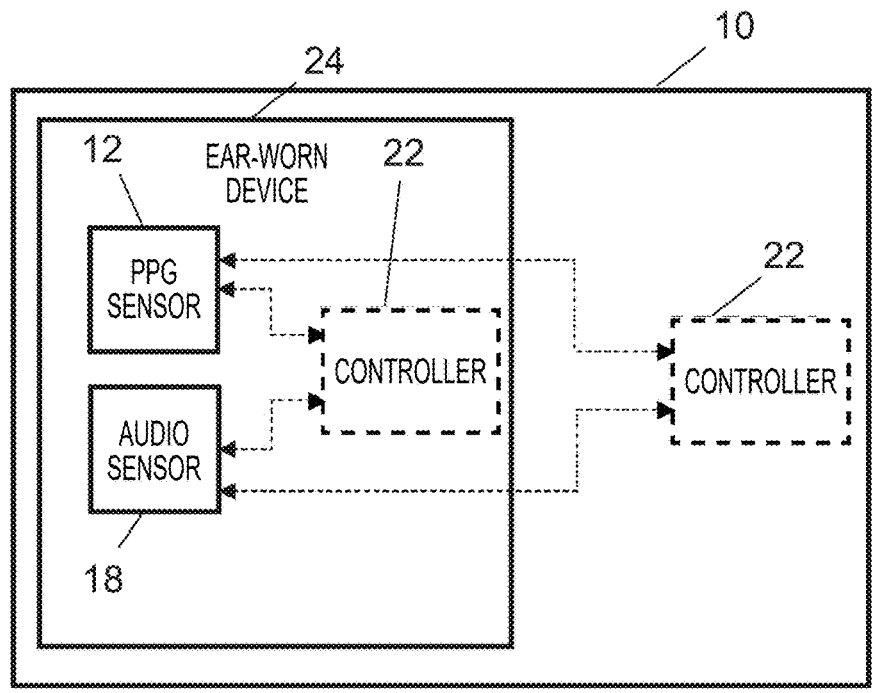
FIG. 1 shows an example of the subject-matter described herein.

Examples of the disclosure relate to apparatus, methods and/or computer programs for and/or involved in blood pressure monitoring.

The following description and FIGS. describe various examples of an apparatus 10 comprising: at least one photoplethysmography (PPG) sensor 12 configured to determine pulse information 14 of a user;
- at least one audio sensor 18 configured to determine heart sound information 20 of the user; and
- means for determining 22, based, at least in part, on the pulse information 14 and the heart sound information 20, blood pressure information of the user, wherein the at least one photoplethysmography (PPG) sensor 12 and the at least one audio sensor 18 are comprised in an ear-worn device 24.

As used herein, an apparatus and/or component for performing one or more actions should also be considered to disclose an apparatus and/or component configured to perform the one or more actions.

Similarly, as used herein, an apparatus and/or component configured to perform one or more actions should also be considered to disclose an apparatus and/or component for performing the one or more actions.

FIG. 1 schematically illustrates an example of an apparatus 10.

Various features referred to in relation to FIG. 1 can be found in the other FIGS.

In the example of FIG. 1, the apparatus 10 comprises at least one PPG sensor 12 and at least one audio sensor 18. The at least one PPG sensor 12 and at least one audio sensor 18 are comprised in an ear-worn device 24.

The at least one PPG sensor 12 and/or the at least one audio sensor 18 can be considered to be integrated, and/or included, and/or embedded, and/or mounted in the ear-worn device 24, and/or to form part of the ear-worn device 24.

In the example of FIG. 1, the apparatus 10 also comprises means for determining 22 blood pressure information of the user. The means for determining 22 can, in some examples, be comprised by the ear-worn device 24 or can, in some examples, be separate from the ear-worn device 24.

Figure 2A:
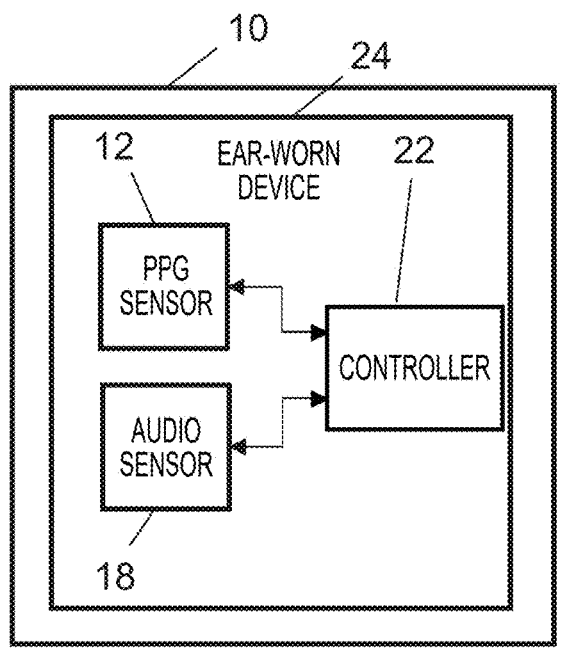
FIG. 2A shows another example of the subject-matter described herein.
Figure 2B:
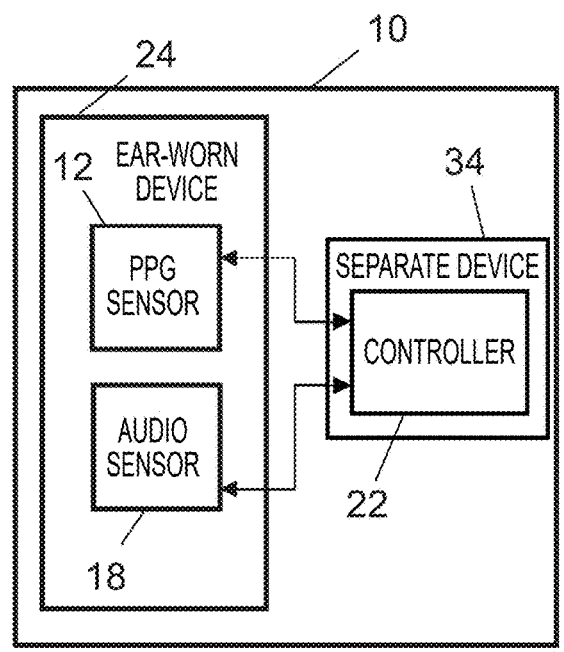
FIG. 2B shows another example of the subject-matter described herein.

Accordingly, in some examples, the means for determining 22 device 24, see, for example FIG. 2A, and in some examples, the means for determining 22 are not comprised in the ear-worn device 24, see, for example, FIG. 2B.

This is indicated in the example of FIG. 1 by the means for determining 22 being represented by a dashed box present both within the ear-worn device 24 and outside of the ear-worn device 24.

In some examples, the means for determining 22 are comprised in a device 34 that is separate from the ear-worn device 24.

The at least one PPG sensor 12 can comprise any suitable PPG sensor or sensors.

For example, the at least one PPG sensor 12 can comprise any suitable PPG sensor or sensors 12 configured to determine pulse information 14 of a user.

In examples, a PPG sensor comprises at least one photodiode and at least one light emitting diode (LED), the LED configured to emit at least one wavelength suitable to detect blood volume changes. Example emission wavelengths for the LED are 530 nm (green), 660 nm (red), and 880 nm (infrared).

The at least one audio sensor 18 can comprise any suitable audio sensor or sensors 18. For example, the at least one audio sensor 18 can comprise any suitable audio sensor or sensors 18 configured to determine heart sound information 20 of the user.

The at least one audio sensor 18 can be considered at least one phonocardiogram sensor and/or at least one phonocardiography sensor (PCG).

For example, the at least one audio sensor 18 can comprise at least one microphone, any suitable type or types of microphone can be used.

In examples, any suitable audio to electric transducer can be used.

In examples, the at least one PPG sensor 12 is configured in the ear-worn device 24 to allow the at least one PPG sensor 12 to determine pulse information 14 of a user when the user is using and/or wearing the ear-worn device 24.

For example, the at least one PPG sensor 12 is, in examples, configured to be located against the skin of the user when the user is using and/or wearing the ear-worn device 24.

Similarly, in examples, the at least one audio sensor 18 is configured in the ear-worn device 24 to allow the at least one audio sensor 18 to determine heart sound information 20 of the user when the user is using and/or wearing the ear-worn device 24.

For example, the at least one audio sensor 18 is, in examples, configured to be located in and/or adjacent to an ear cavity of the user when the user is using and/or wearing the ear-worn device 24. In examples, the at least one audio sensor 18 can be considered at least one in-ear audio sensor 18.

The ear canal provides an advantageous location to detect internal body sounds that would be otherwise difficult to record. For example, the ear canal provides a body cavity into which a microphone can be inserted and the cavity substantially sealed without discomfort or inconvenience.

In examples, the at least one PPG sensor 12 and/or the at least one audio sensor 18 is configured to operate at a sampling frequency of at least 100 Hz.

In examples, the at least one PPG sensor 12 and/or the at least one audio sensor 18 is configured to operate at a sampling rate in the range 100 Hz to 1 kHz.

In examples, the at least one PPG sensor 12 and/or the at least one audio sensor 18 is configured to operate at a sampling rate in the range 100 Hz to 5 kHz.

In examples, the at least one PPG sensor 12 and/or the at least one audio sensor 18 is configured to operate at a sampling rate in the range 100 Hz to 9 kHz.

In examples, the ear-worn device 24 is a device 24 worn on and/or in at least one ear of the user.

In examples, the ear-worn device 24 is a device 24 worn on and/or in a single ear of the user.

In examples, the ear-worn device 24 is a device 24 supported by at least one ear of the user.

In examples, the ear-worn device 24 is a device 24 supported by a single ear of the user.

In examples, the ear-worn device 24 comprises or is at least one of an earbud, an earphone and a headphone.

Examples of an ear-worn device 24, that can have the form of an earbud, an earphone, and a headphone are:
- a dedicated device for blood pressure monitoring;
- a dedicated device for blood pressure monitoring and other monitoring;
- a hearing aid;
- an earplug for blocking sounds and so on.

The means for determining 22 can comprise any suitable means for determining, based, at least in part, on the pulse information 14 and the heart sound information 20, blood pressure information of the user.

As used herein, the term "determining" (and grammatical variants thereof) can include at least: calculating, computing, processing, deriving, investigating, looking up (for example, looking up in a table, a database or another data structure), ascertaining, obtaining, sensing and the like. Also "determining" can include receiving (for example, receiving information), accessing (for example, accessing data in a memory) and the like. Also "determining" can include resolving, selecting, choosing, establishing, and the like.

Figure 7A:
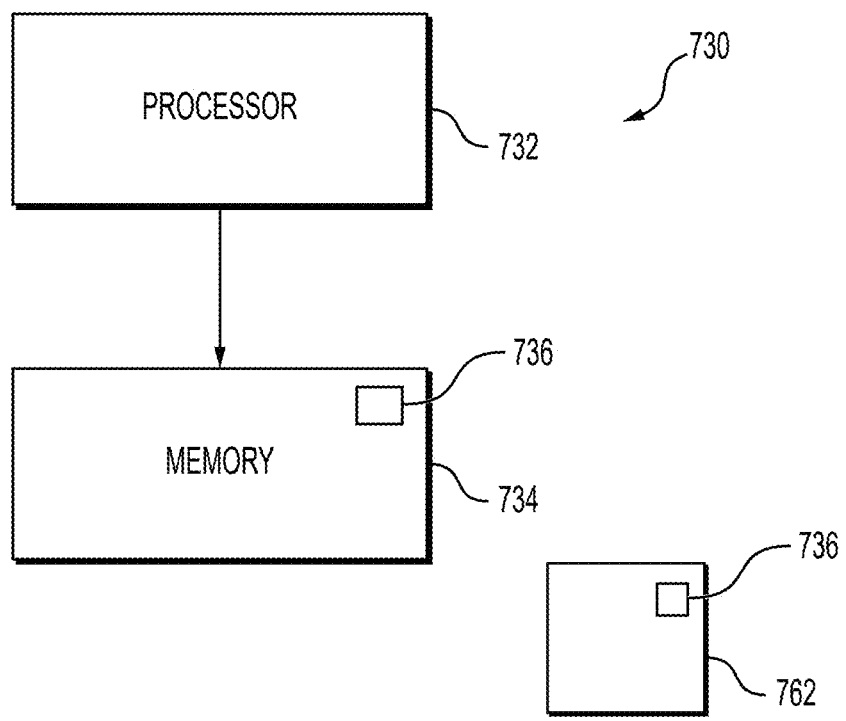
FIG. 7A shows another example of the subject-matter described herein.
Figure 7B:
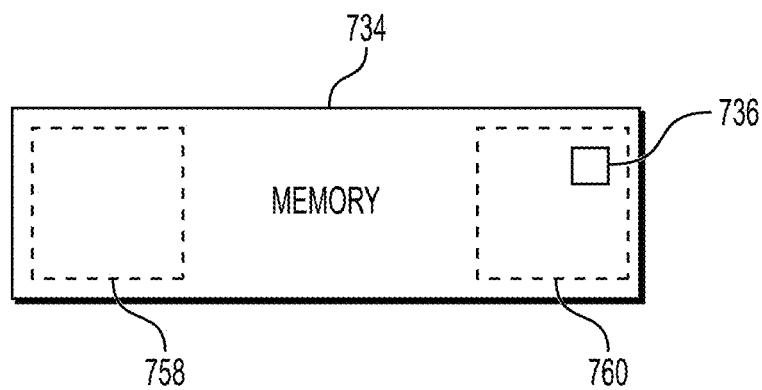
FIG. 7B shows another example of the subject-matter described herein.
Figure 8:
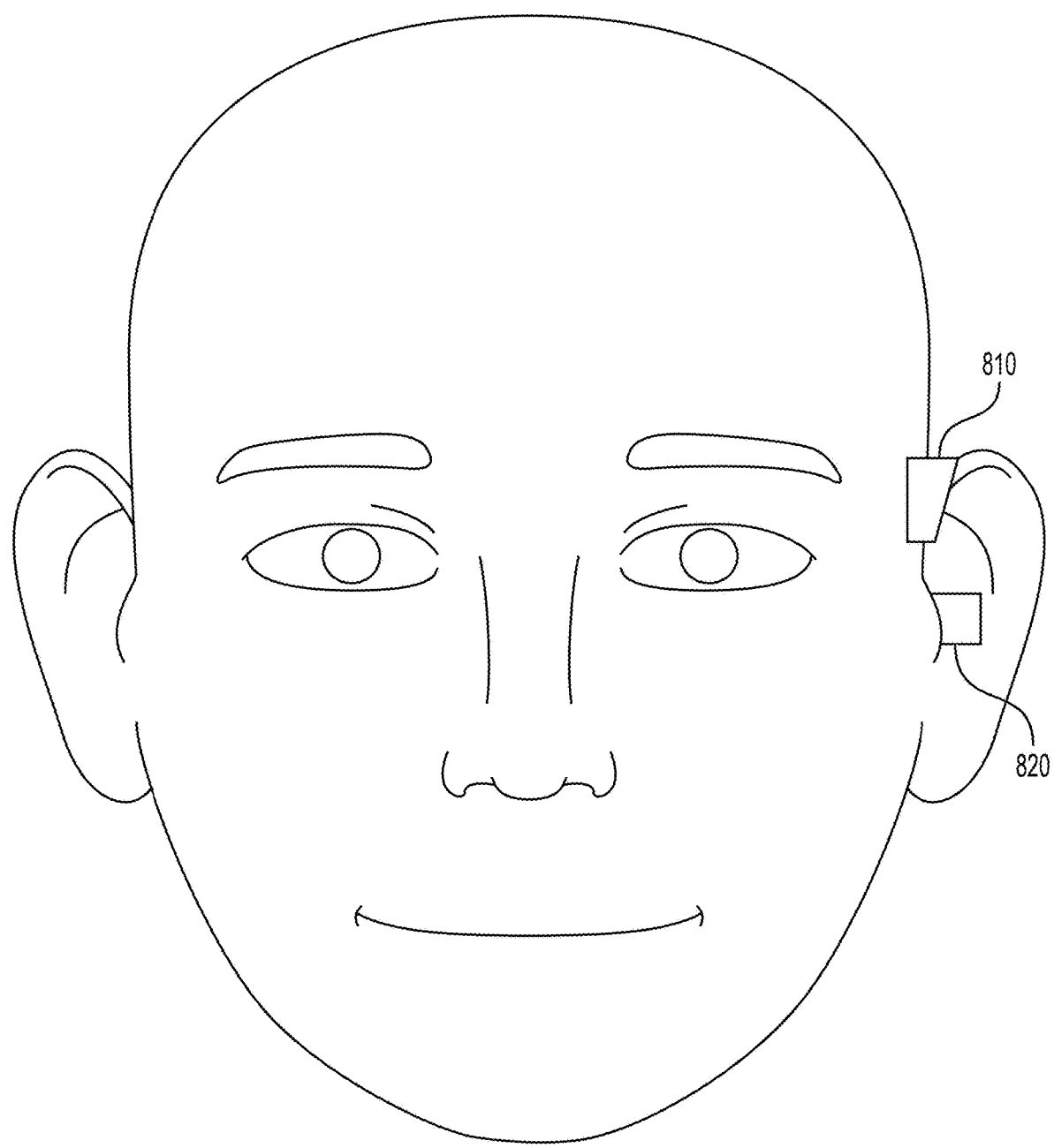
FIG. 8 shows another example of the subject-matter described herein, including an ear-worn device worn on and/or in at least one ear of a user.

In examples, the means for determining 22 comprises a controller as described in relation to FIGS. 7A and 7B.

In some examples, the means for determining 22 comprises at least one processor 732; and at least one memory 734 including computer program code, the at least one memory 734 storing instructions that, when executed by the at least one processor 732 cause the performance of the apparatus 10 described herein.

Information, for example, pulse information 14 and/or heart sound information 18 and/or control information can be communicated between the at least one PPG sensor 12 and the means for determining 22, and the at least one audio sensor 18 and the means for determining 22. This is illustrated in the example of FIG. 1 by the dashed double headed arrows linking elements 12 and 18 with element 22.

Information can be communicated in any suitable way. For example, information can be communicated wired and/or wirelessly.

There can be any number of intervening elements between the at least one PPG sensor 12 and the means for determining 22 and/or between the at least one audio sensor 18 and the means for determining 22 (including no intervening elements).

FIG. 2A schematically illustrates an example of an apparatus 10.

The apparatus 10 illustrated in the example of FIG. 2A is an example of the apparatus 10 of FIG. 1 in which the means for determining 22 is comprised in the ear-worn device 24.

Accordingly, the example of FIG. 2A illustrates an apparatus 10 as described herein wherein the means for determining 22 are comprised in the ear-worn device 24.

FIG. 2B schematically illustrates an example of an apparatus 10.

The apparatus 10 illustrated in the example of FIG. 2B is the apparatus 10 of FIG. 1 in which the means for determining 22 are comprised in a device 34 that is separate from the ear-worn device 24.

Accordingly, the example of FIG. 2B illustrates an apparatus 10 comprising:

the ear-worn device 24, and a device 34 that is separate from the ear-worn device 24, wherein the means for determining 22 are comprised in the device 34 that is separate from the ear-worn device 24.

The device 34 that is separate from the ear-worn device 24 can comprise or be any suitable device 34. For example, the device 34 can comprise or be any suitable device 34 comprising means for determining 22, based, at least in part, on pulse information 14 and heart sound information 18, blood pressure information of a user.

Figure 3:
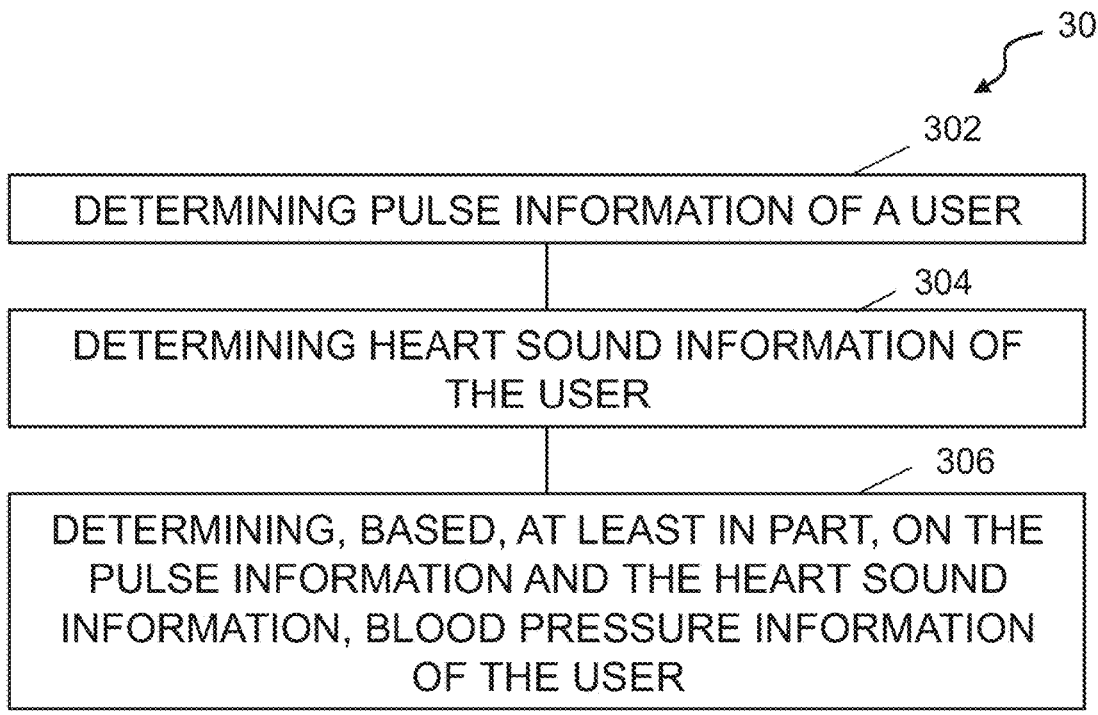
FIG. 3 shows another example of the subject-matter described herein.

For example, the device 34 can comprise a user device such as a computing device, for example a mobile telephone, and/or one or more wearable devices, and/or a computer and so on. FIG. 3 illustrates an example of a method 300.

One or more of the features discussed in relation to FIG. 3 can be found in one or more of the other FIGS. During discussion of FIG. 3, reference will be made to one or more other FIGS. for the purpose of explanation.

In examples, method 300 can be considered a method of determining blood pressure information.

In examples, method 300 can be considered a method of monitoring blood pressure.

In examples, method 300 can be considered to be a non-invasive method of determining and/or monitoring blood pressure information.

Method 300 can be performed by any suitable apparatus comprising any suitable means for performing the method 300.

In examples, method 300 can be performed by the apparatus of FIG. 1, and/or FIG. 2A, and/or FIG. 2B.

At block 302, method 300 comprises determining pulse information 14 of a user using at least one photoplethysmography (PPG) sensor 12 comprised in an ear-worn device 24.

Determining pulse information 14 of a user using at least one photoplethysmography (PPG) sensor 12 comprised in an ear-worn device 24 can be performed in any suitable way using any suitable method.

For example, the at least one PPG sensor 12 can be used and/or controlled in any suitable way to obtain the pulse information 14 of the user.

The at least one PPG sensor 12 can comprise any suitable PPG sensor(s) 12. For example, the at least PPG sensor 12 can comprise at least one PPG sensor 12 as described in relation to FIG. 1.

As used herein, pulse information 14 is intended to include any information indicative of and/or related to a user's pulse.

In examples, pulse information 14 can be considered to comprise any information indicative of and/or related to movement of a user's blood caused by the user's heart beating.

In examples, pulse information 14 can be considered any information indicative of and/or related to changes in a user's blood volume caused by the user's heart beating.

In examples, pulse information 14 can be considered any information from which one or more systolic peaks 30 can be determined.

In examples, the ear-worn device 24 is a device worn on and/or in at least one ear of the user.

At block 304, method 300 comprises determining heart sound information 20 of the user using at least one audio sensor 18 comprised in the ear-worn device 24.

Determining heart sound information 20 of the user using at least one audio sensor 18 comprised in the ear-worn device 24 can be performed in any suitable way using any suitable method.

For example, the at least one audio sensor 18 can be used and/or controlled in any suitable way to obtain the heart sound information 20 of the user.

The at least one audio sensor 18 can comprise any suitable audio sensor(s) 18. For example, the at least one audio sensor 18 can comprise one or more audio sensors 18 as described in relation to FIG. 1.

As used herein, heart sound information 20 is intended to include any information indicative of and/or related to sounds made by the user's heart beating.

In examples, heart sound information 20 can be considered to comprise any suitable information indicative or and/or related to sounds produced by the closing of the heart valves during the systolic (S1) and diastolic (S2) cycles and propagate through the body.

In examples, the S1 heart sound is the sound of the closure of the mitral and tricuspid valves and the S2 heart sound is the sound of the closure of the aortic and pulmonic valves.

In examples, heart sound information 20 can be considered to comprise any information indicative of and/or related to timing of the sounds produced by the user's heart when it is beating.

Figure 4:
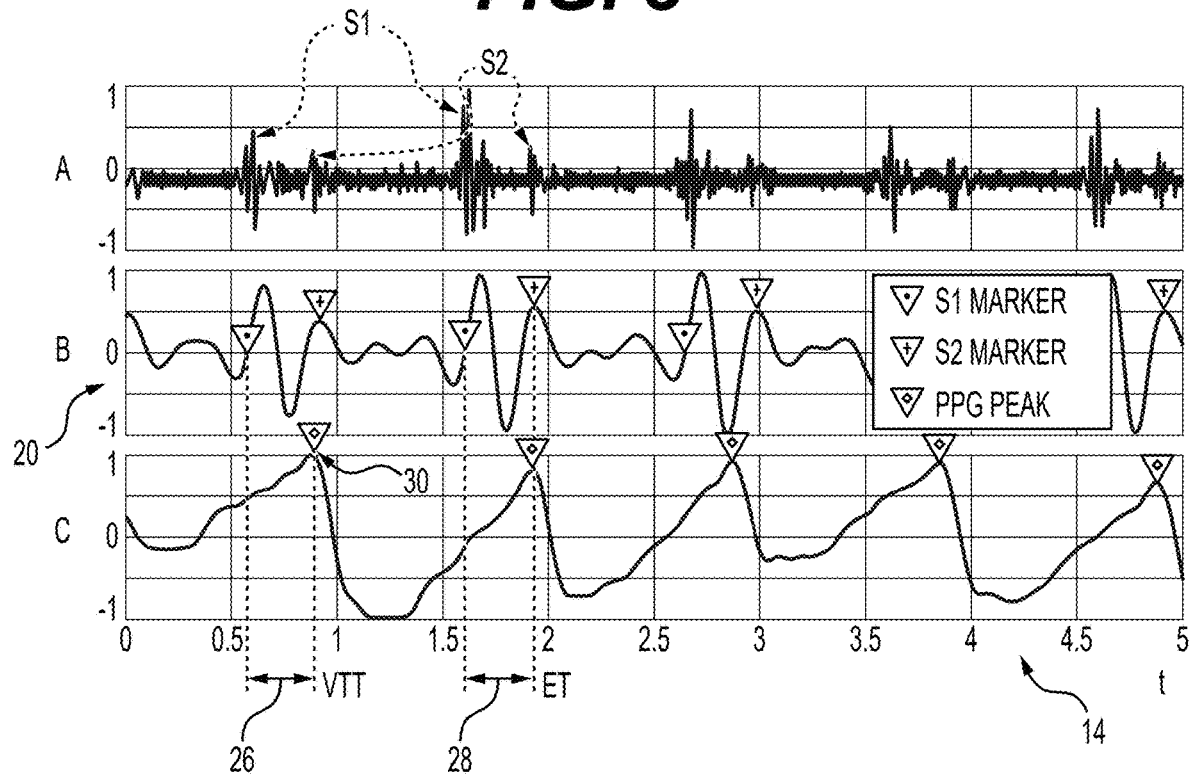
FIG. 4 shows another example of the subject-matter described herein.

An example of pulse information 14 and heart sound information 20 from at least one audio sensor 18 and at least one PPG sensor 12 in an ear-worn device 24 is illustrated in the example of FIG. 4.

In the example of FIG. 4, three separate, temporally aligned plots are illustrated.

The middle plot, labelled B, illustrates heart sound information 20 from at least one audio sensor 18 comprised in an ear-worn device 24 as a function of time.

The lower plot, labelled C, illustrates pulse information 14 from at least one PPG sensor 12 in an ear-worn device 24 as a function of time.

The upper plot in FIG. 4 illustrates heart sound information 20 from a chest worn audio sensor as a function of time, as a reference.

The example of FIG. 4 will be discussed in greater detail later.

Returning to the example of FIG. 3, at block 306, method 300 comprises determining, based, at least in part, on the pulse information 14 and the heart sound information 20, blood pressure information of the user.

Consequently, FIG. 3 illustrates a method 300 comprising:

determining pulse information 14 of a user using at least one photoplethysmography (PPG) sensor 12 comprised in an ear-worn device 24;

determining heart sound information 20 of the user using at least one audio sensor 18 comprised in the ear-worn device 24; and determining, based, at least in part, on the pulse information 14 and the heart sound information blood pressure information of the user.

In examples, determining, based, at least in part, on the pulse information 14 and the heart sound information 20, blood pressure information of the user can be performed in any suitable way using any suitable method.

In examples, block 306 can be performed by means for determining 22 of FIG. 1 and/or FIG. 2A, and/or FIG. 2B, and/or of FIG. 7A, and/or 7B.

In examples, determining, based, at least in part, on the pulse information 14 and the heart sound information 20, blood pressure information of the user can comprise receiving the blood pressure information of the user.

In examples, block 306 comprises processing the pulse information 14 and/or heart sound information 20 and/or using one or more models to determine blood pressure information of the user.

Any suitable processing of the pulse information 14 and/or heart sound information 20 can be used to determine blood pressure information of the user. For example, processing can comprise using a sliding window, fitting data, filtering, smoothing and/or feature extraction and so on.

In examples, determining blood pressure information of the user comprises determining vascular transit time 26 and ejection time 28.

Vascular transit time 26 can be considered the time delay between the first heart sound (S1) and the upstroke of the corresponding pulse wave/systolic peak 30.

Ejection time 28 can be considered the time difference between the first heart sound (S1) and the second heart sound (S2).

By way of example, reference is again made to the example of FIG. 4.

In the upper plot of FIG. 4, labelled A, the first and second heart sounds S1, S2 are indicated in the plot.

In the corresponding heart sound information 20 from the at least one audio sensor 18 comprised in the ear-worn device 24 (plot B in FIG. 4), S1 and S2 markers are indicated. The S1 markers are indicated by a triangle with a solid dot and the S2 markers by a triangle with a cross.

In the pulse information 14 from the at least one PPG sensor 12 comprised in the ear-worn device 24 (plot C in the example of FIG. 4) the systolic/PPG peaks are indicated. The systolic peaks 30 are indicated by a triangle with an open dot.

As indicated in the example of FIG. 4, the vascular transit time (VTT) 26 can be determined from the pulse information 14 and heart sound information 20 as the time difference between the S1 heart sound and the systolic peak 30.

As illustrated in the example of FIG. 4 the ejection time (ET) 28 can be determined from the heart sound information 20 as the time difference between the first heart sound (S1) and second heart sound (S2).

Accordingly, in examples, determining blood pressure information of the user comprises determining S1 and S2 heart sounds based, at least in part, on the heart sound information 20 and/or determining a systolic peak 30 based, at least in part, on the pulse information 14.

Referring again to FIG. 3, in examples, determining S1 and S2 heart sounds comprises determining a location of a systolic peak 30 based, at least in part, on the pulse information 14.

For example, as can be seen in the example of FIG. 4, the S1 and S2 heart sounds create two pairs of consecutive local negative peak and local positive peak in each cardiac cycle in the heart sound information 20. These two pairs are followed by a systolic peak 30 in the pulse information 14 in the same cycle.

In examples, that systolic peak 30 is used as a pivot and two local maxima search for within its adjacent location. The two local maxima can then be used to search for the two corresponding local minima.

The S1 marker can be located at the zero-crossing point of the peak pair which happens first in the time domain, and the S2 marker at the positive peak of the remaining pair.

Figure 6:
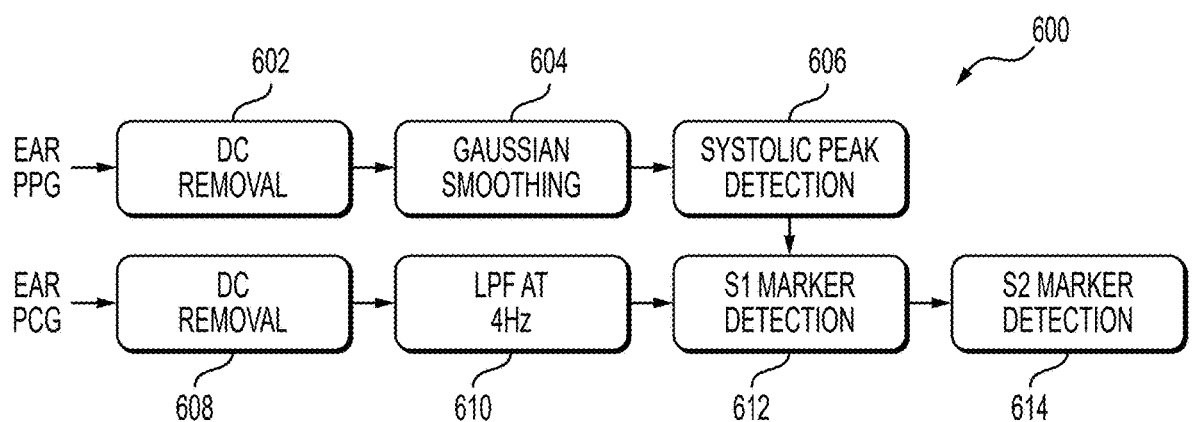
FIG. 6 shows another example of the subject-matter described herein.

FIG. 6 illustrates an example of a method 600.

Method 600 can be considered a method of determining systolic peak(s) 30, S1 and S2 positions based, at least in part, on the pulse information 14 and heart sound information 20.

Method 600 can be considered a method of determining information to allow a determination of vascular transit time (VTT) 26 and ejection time (ET) 28.

Method 600 can be considered a method of determining vascular transit time (VTT) 26 and ejection time (ET) 28.

In the example of FIG. 6 raw data is received from at least one PPG sensor 12 comprised in an ear-worn device 24 (arrow pointing to block 602) and from at least one audio sensor (PCG sensor) 18 comprised in the ear-worn device 24 (arrow pointing to block 608).

In the example of FIG. 6, the raw data is continually processed using a sliding window of 10 seconds with 90% overlap following the method illustrated in the example of FIG. 6.

At blocks 602 and 608 the DC linear drifting in both PCG (block 608) and PPG (block 602) signals is removed. In the example of FIG. 6, this is done by excluding the 6th-order polynomial fit from each sub-window of 2.5 seconds in the current processing window. However, any suitable method can be used.

Then each signal is processed/analyzed to find the location of S1, S2 sounds and the systolic peak 30 in their time domain. This allows the VTT 26 and ET 28 to be calculated from the time differences between the systolic peak 30 and S1 marker, and S2 & S1 markers, respectively.

The blood pressure information, for example estimated systolic blood pressure (SBP) and diastolic blood pressure (DBP) measurements, can be determined using one or more blood pressure models.

Each cardiac cycle ejects blood into the aorta which then propagates throughout the body. The arrival of the blood at the arterial branches under the PPG sensor creates a local peak on the PPG signal, called the systolic peak 30.

At block 604 a Gaussian smoothing is applied to remove high-frequency noise in the detrended in-ear PPG signal, yet preserve the signal magnitude.

At block 606 a peak detection algorithm is used within each predefined non-overlapping sub-window to find the maximum of that sub-window and mark it as the corresponding systolic peak 30. Any suitable peak detection algorithm can be used.

Since the normal heartbeat range is 40-180 bpm, S1 and S2 typically happen at a frequency below 3 Hz.

At block 610, a low-pass filter is used to extract this frequency range of interest. However, using a low-pass filter normally creates a time delay in the output signal and leads to inaccuracies in detecting the exact location of S1 and S2 heart sounds.

This would lead to the wrong measurement of the VTT 26 and ET 28, resulting in poor performance for determination of blood pressure information.

In the example of FIG. 6, a forward-backward filtering method is used to ensure no phase distortion and time delay. These characteristics help preserve features in a filtered time waveform exactly where they occur in the unfiltered original signal.

At block 612, S1 marker detection is performed an at block 614, S2 marker detection is performed.

S1 and S2 heart sounds create two pairs of consecutive local negative peak and local positive peak in each cardiac cycle of the filtered in-ear PCG signal. These two pairs are followed by a PPG systolic peak 30 in the same cardiac cycle.

In the example of FIG. 6, that systolic peak 30 is used as a pivot and a search performed for the two local maxima within the adjacent location of the systolic peak 30.

In the example of FIG. 6, those two local maxima are used to search for the two corresponding local minima.

From empirical observations, in the example of FIG. 6, the S1 marker is located at the zero-crossing point of the peak pair which happens first in the time domain, and the S2 marker at the positive peak of the remaining pair.

To determine VTT 26 and ET 28, two intervals can be computed, in examples, for each cardiac cycle:

Vascular transit time (VTT)=$t_{PPG}-t_{S1}$

Ejection time (ET)=$t_{S2}-t_{S1}$

In examples, the determined VTT 26 and ET 28 are used in one or more models to determine blood pressure information of the user.

Any suitable model or models can be used.

The change in systolic blood pressure measurement is correlated to the change in VTT 26. Thus, the systolic blood pressure can be related to the vascular transit time 26 by the linear approximation:

$$SBP \approx \alpha_1 VTT + \alpha_2 \qquad \text{Eq. (1)}$$

Where $\alpha_1$ and $\alpha_2$ are pre-calibration constants

The diastolic blood pressure can be inferred from the SBP and the Pulse Pressure (PP), which is the difference between SBP and DBP, as:

$$DBP = SBP - PP \qquad \text{Eq. (2)}$$

Studies have proposed the relationship between PP and Stroke Volume (SV) and the arterial compliance C as $$PP = \frac{SV}{C}.$$

Stroke volume (SV) is the volume of blood ejected from each ventricle due to the contraction of the heart and is shown to have a linear relationship with Ejection Time (ET):

$$SV = \beta_1 ET + \beta_2 \qquad \text{Eq. (3)}$$

Where $\beta_1$ and $\beta_2$ are pre-calibration constants.

Since VTT 26 can be considered as the time taken for a pulse wave to travel along an arterial tube with length l:

$$VTT = l\sqrt{\frac{\rho C}{A}} \qquad \text{Eq. (4)}$$

where $\rho$ is the fluid density, A and C are the cross-sectional area and compliance of the tube, respectively. Thus, PP can be rewritten as:

$$PP = \frac{SV}{C} = \frac{\beta_1 ET + \beta_2}{\frac{A}{\rho l^2}VTT^2} \qquad \text{Eq. (5)}$$

Because A, $\rho$, C are user-specific parameters, the pulse pressure can be estimated as:

$$PP \approx \gamma_1 \frac{ET}{VTT^2} + \gamma_2 \frac{1}{VTT^2} + \gamma_3 \qquad \text{Eq. (6)}$$

Where $\gamma_1$, $\gamma_2$ and $\gamma_3$ are pre-calibration constants.

Using the determined VTT 26 and ET 28, both systolic blood pressure and diastolic blood pressure can be determined using equation 1 and the combination of eq. 2 and 6. The pre-calibration constants are obtained for a user to normalise the blood pressure information to the user. This can allow a determination and/or an estimation of the blood pressure for the user.

In examples, the above equations can be used without pre-calibration constants. In such examples, the determined blood pressure information can still provide information on changes and/or trends in the users blood pressure. The changes and/or trends can be determined by monitoring and/or observing the non-calibrated blood pressure information over time.

Returning to the example of FIG. 3, accordingly, in examples, method 300 comprises determining calibration information for the user and determining and/or estimating blood pressure of the user based, at least in part, on the blood pressure information and the calibration information.

Determining calibration information for the user can be performed in any suitable way using any suitable method.

In examples, determining calibration information for the user comprises measuring the VTT of the user using an apparatus as described herein (in-ear VTT) while, at the same time, measuring the user's blood pressure with a high-accuracy blood pressure monitoring device, such as a cuff-based device (Cuff BP). At least 2 such measurements should be gathered but typically more measurements will lead to better accuracy.

These measurements provide aligned pairs of values in the form <Cuff BP, in-ear VTT>, one pair for each measurement. With the VTT of the user, blood pressure of the user can be approximated using Equation 1.

To find the values of the alpha-1 and alpha-2 parameters a least-square fitting algorithm can be used, for example, where the <Cuff BP, in-ear VTT> pairs are treated as datapoints. In effect, these points are plotted in a 2D plane, VTT on the x-axis and Cuff BP on the y-axis and a linear curve (i.e., Equation 1) found which approximates these points with the minimum error. In examples, the least-square fitting algorithm does that by finding the optimal values for the alpha-1 and alpha-2 parameters.

Once this is done, evaluating Equation 1 for a measured value of VTT will give the corresponding value of blood pressure. If the calibration has been performed correctly, this value will be the actual (or close to it) blood pressure of the user.

In examples, for diastolic blood pressure a similar calibration procedure can be used but in this case, ET is also needed, in addition to VTT, and the equation to fit contains three parameters, gamma-1, gamma-2 and gamma-3.

Figure 5:
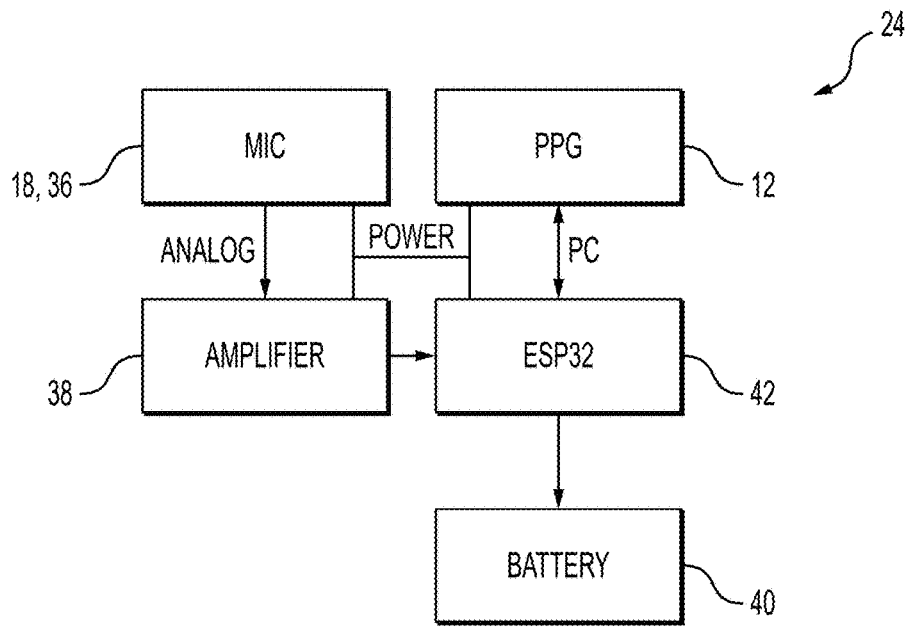
FIG. 5 shows another example of the subject-matter described herein.

FIG. 5 schematically illustrates an example of an ear-worn device 24.

In the example of FIG. 5, the ear-worn device comprises in-ear PCG and PPG sensors 18, 12.

In the example of FIG. 5, the ear-worn device comprises an audio sensor 18 in the form of a microphone 36 that is positioned inside an earbud casing facing towards the ear canal.

In the illustrated example, the signal from the microphone 36 is amplified with an amplifier 38 and then sampled at 16 kHz by an ESP32 microcontroller 42.

In FIG. 5, the PPG signal is acquired at a frequency of 100 Hz by a MAXM86161 which is connected to the ESP32 via I2C.

The ear-worn device 24 of FIG. 5 is powered by battery 40.

Examples of the disclosure are advantageous and/or provide technical benefits.

For example, examples of the disclosure provide for a non-invasive and/or unobtrusive method for monitoring blood pressure information of a user. For example, examples of the disclosure provide for a method of monitoring blood pressure information that does not require a user to wear an uncomfortable cuff or involve invasive surgical methods.

For example, examples of the disclosure provide for blood pressure monitoring at a single site by a single device. Examples of the disclosure use an ear-insertable device that is easy to put-on and take-off and provide for blood pressure monitoring capability to be included in devices that have other functionality, such as headphones, or hearing aids.

For example, examples of the disclosure make use of properties of the ear to efficiently and effectively determining pulse information and heart sound information. For example, the ear cavity allows for heart sound information to be readily determined and the dense vascular structure of the ear, in combination with high blood profusion, enables determination of the blood movement of the user.

For example, examples of the disclosure provide for determination of information using an ear-worn device of the head of a user. The head is generally less susceptible to motion artifacts due to the muscular skeletal system's natural vibration damping and is at a fixed difference from the heart which is advantageous for high accuracy blood pressure measurements.

For example, examples of the disclosure provide for determination of blood pressure information where, for example, other methods are not possible such as measurement involving a pressure cuff during surgery.

This can, for example, be advantageous where blood pressure measurements are used as a substitute for brain perfusion as examples of the disclosure provide a blood pressure measurement closer to the brain than, for example, the arms.

For example, examples of the disclosure enables the non-invasive measurement of blood pressure information from a single device and is not affected by pre-ejection period variability. FIG. 7A illustrates an example of a controller 730. In examples, the controller 730 can provide means for determining 22 described herein. For example, controller 730 can provide the means for determining 22 of FIG. 1, and/or FIG. 2A, and/or FIG. 2B.

In examples, the controller 730 can be considered an apparatus.

Implementation of a controller 730 may be as controller circuitry. The controller 730 may be implemented in hardware alone, have certain aspects in software including firmware alone or can be a combination of hardware and software (including firmware).

As illustrated in FIG. 7A the controller 730 may be implemented using instructions that enable hardware functionality, for example, by using executable instructions of a computer program 736 in a general-purpose or special-purpose processor 732 that may be stored on a computer readable storage medium (disk, memory etc.) to be executed by such a processor 732.

The processor 732 is configured to read from and write to the memory 734. The processor 732 may also comprise an output interface via which data and/or commands are output by the processor 732 and an input interface via which data and/or commands are input to the processor 732.

The memory 734 stores a computer program 736 comprising computer program instructions (computer program code) that controls the operation of the apparatus when loaded into the processor 732. The computer program instructions, of the computer program 736, provide the logic and routines that enables the apparatus to perform the methods illustrated in FIGS. 3 and/or 6. The processor 732 by reading the memory 734 is able to load and execute the computer program 736.

The apparatus therefore comprises:
at least one processor 732; and
at least one memory 734 including computer program code
the at least one memory 734 and the computer program code configured to, with the at least one processor 732, cause the apparatus at least to perform:
determining pulse information of a user using at least one photoplethysmography sensor comprised in an ear-worn device;

determining heart sound information of the user using at least one audio sensor comprised in the ear-worn device; and determining, based, at least in part, on the pulse information and the heart sound information, blood pressure information of the user.

As illustrated in FIG. 7A the computer program 736 may arrive at the apparatus via any suitable delivery mechanism 762. The delivery mechanism 762 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 736. The delivery mechanism may be a signal configured to reliably transfer the computer program 736. The apparatus may propagate or transmit the computer program 736 as a computer data signal.

Computer program instructions for causing an apparatus to perform at least the following or for performing at least the following:

determining pulse information of a user using at least one photoplethysmography sensor comprised in an ear-worn device;

determining heart sound information of the user using at least one audio sensor comprised in the ear-worn device; and determining, based, at least in part, on the pulse information and the heart sound information, blood pressure information of the user.

The computer program instructions may be comprised in a computer program, a non-transitory computer readable medium, a computer program product, a machine readable medium. In some but not necessarily all examples, the computer program instructions may be distributed over more than one computer program.

Although the memory 734 is illustrated as a single component/circuitry it may be implemented as one or more separate components/circuitry some or all of which may be integrated/removable and/or may provide permanent/semi-permanent/dynamic/cached storage.

In examples the memory 734 comprises a random-access memory 758 and a read only memory 760. In examples the computer program 736 can be stored in the read only memory 758. See, for example, FIG. 7B Although the processor 732 is illustrated as a single component/circuitry it may be implemented as one or more separate components/circuitry some or all of which may be integrated/removable. The processor 732 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 3 and/or 6 may represent steps in a method and/or sections of code in the computer program 736. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
    an ear-worn device, the ear-worn device including:
        at least one photoplethysmography sensor configured to determine pulse information of a user from an ear of the user, and
        at least one audio sensor configured to determine heart sound information of the user from an ear of the user, wherein the at least one photoplethysmography sensor and the at least one audio sensor both form part of the ear-worn device;
    at least one processor; and
    at least one memory storing instructions that, when executed by the at least one processor, cause the apparatus at least to:
        determine blood pressure information of the user based on the pulse information and the heart sound information.

2. An apparatus as claimed in claim 1, wherein the ear-worn device is a device worn on and/or in at least one ear of the user.

3. An apparatus as claimed in claim 1, wherein the determining of blood pressure information of the user comprises:
    identifying an S1 heart sound in the heart sound information;
    identifying a systolic peak in the pulse information;
    calculating a vascular transit time as the time difference between the identified S1 heart sound and the identified systolic peak; and
    determining the blood pressure information of the user based on the vascular transit time calculated as the time difference between the identified S1 heart sound and the identified systolic peak.

4. An apparatus as claimed in claim 1, wherein the determining of blood pressure information of the user comprises:
    identifying an S1 heart sound in the heart sound information;
    identifying an S2 heart sound in the heart sound information;
    calculating an ejection time as the time difference between the identified S1 heart sound and the identified S2 heart sound; and
    determining blood pressure information of the user based on the ejection time calculated as the time difference between the identified S1 heart sound and the identified S2 heart sound.

5. An apparatus as claimed in claim 4, wherein the identifying of S1 and S2 heart sounds comprises:
    identifying a systolic peak in the pulse information; and
    identifying the S1 and S2 heart sounds based on a location of the systolic peak identified in the pulse information.

6. An apparatus as claimed in claim 1, wherein the at least one photoplethysmography sensor and/or the at least one audio sensor are configured to operate at a sampling rate in the range 100 Hz to 9 kHz.

7. An apparatus as claimed in claim 1 wherein the instructions, when executed by the at least one processor, further cause the apparatus to:
    determine calibration information for the user and determine blood pressure of the user based, at least in part, on the blood pressure information and the calibration information.

8. An apparatus as claimed in claim 1, wherein the at least one processor and the at least one memory storing instructions are comprised by the ear-worn device.

9. An apparatus as claimed in claim 1, further comprising a device that is separate from the ear-worn device, wherein the at least one processor and the at least one memory storing instructions are comprised in the device that is separate from the ear-worn device.

10. A method comprising:
    determining pulse information of a user from an ear of the user using at least one photoplethysmography sensor comprised in an ear-worn device;
    determining heart sound information of the user from an ear of the user using at least one audio sensor comprised in the ear-worn device, wherein the at least one photoplethysmography sensor and the at least one audio sensor both form part of the ear-worn device; and
    determining blood pressure information of the user based on the pulse information and the heart-sound information.

11. A method as claimed in claim 10, wherein the ear-worn device is a device worn on and/or in at least one ear of the user.

12. A method as claimed in claim 10, wherein the determining of blood pressure information of the user comprises:
identifying an S1 heart sound in the heart sound information;
identifying a systolic peak in the pulse information;
calculating a vascular transit time as the time difference between the identified S1 heart sound and the identified systolic peak; and
determining the blood pressure information of the user based on the vascular transit time calculated as the time difference between the identified S1 heart sound and the identified systolic peak.

13. A non-transitory computer readable medium comprising program instructions for causing an apparatus to perform:
determining pulse information of a user from an ear of a user using at least one photoplethysmography sensor comprised in an ear-worn device;
determining heart sound information of the user from an ear of the user using at least one audio sensor comprised in the ear-worn device, wherein the at least one photoplethysmography sensor and the at least one audio sensor both form part of the ear-worn device; and
determining blood pressure information of the user based on the pulse information and the heart sound information.

14. A non-transitory computer readable medium as claimed in claim 13, wherein the determining of blood pressure information of the user comprises:
identifying an S1 heart sound in the heart sound information;
identifying a systolic peak in the pulse information;
calculating a vascular transit time as the time difference between the identified S1 heart sound and the identified systolic peak; and
determining the blood pressure information of the user based on the vascular transit time calculated as the time difference between the identified S1 heart sound and the identified systolic peak.

15. A non-transitory computer readable medium as claimed in claim 13, wherein the determining of blood pressure information of the user comprises:
identifying an S1 heart sound in the heart sound information;
identifying an S2 heart sound in the heart sound information;
calculating an ejection time as the time difference between the identified S1 heart sound and the identified S2 heart sound; and
determining blood pressure information of the user based on the ejection time calculated as the time difference between the identified S1 heart sound and the identified S2 heart sound.

16. A method as claimed in claim 10, wherein the determining of blood pressure information of the user comprises:
identifying an S1 heart sound in the heart sound information;
identifying an S2 heart sound in the heart sound information;
calculating an ejection time as the time difference between the identified S1 heart sound and the identified S2 heart sound; and
determining blood pressure information of the user based on the ejection time calculated as the time difference between the identified S1 heart sound and the identified S2 heart sound.

* * * * *